PROCESS FOR REINFORCING OPEN HEMISPHERICAL TRANSDUCERS
Original Filed Nov. 30, 1962
Fig. 1
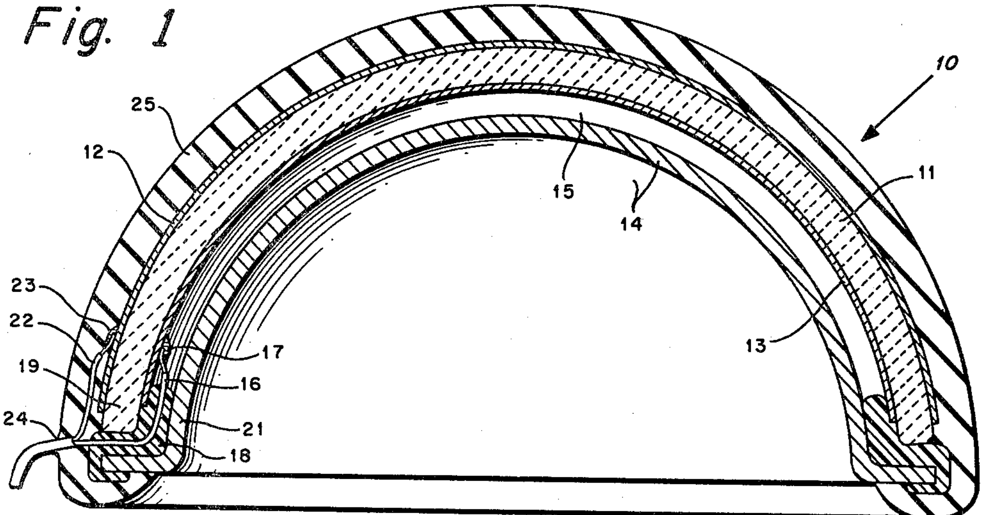
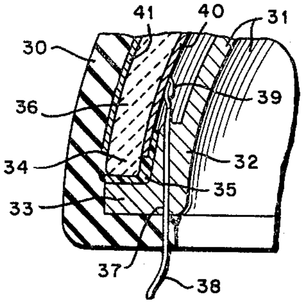
Fig. 2
Fig. 4
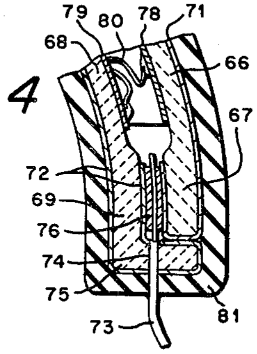
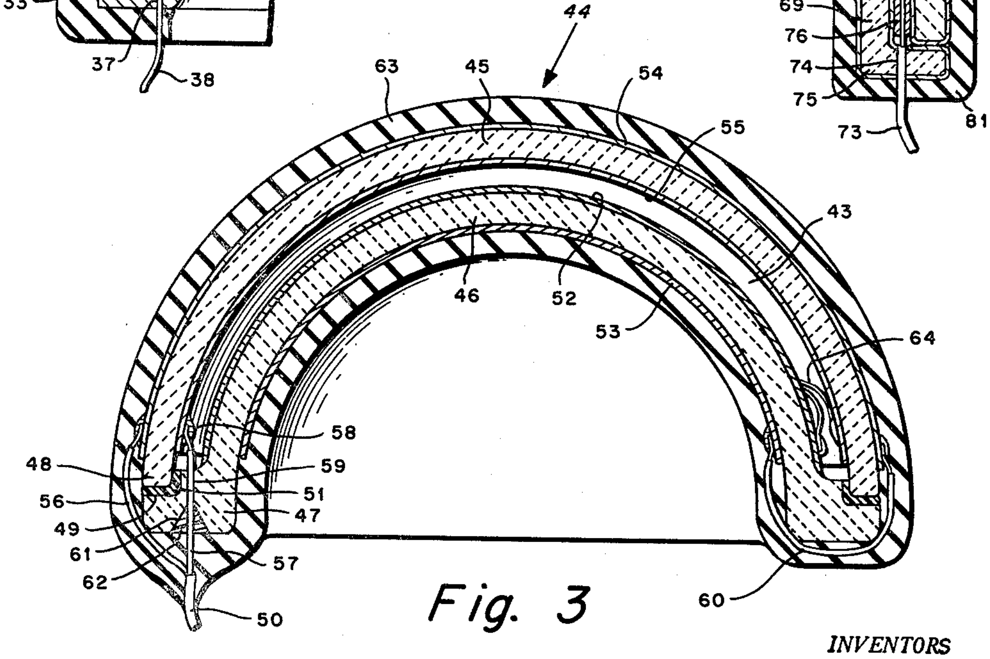
Fig. 3
INVENTORS
JOHN J. HORAN
JAMES R. BROWN JR.
MAURICE F. PRESSLER
BY
ATTORNEYS Aug. 24, 1965 J. J. HORAN ETAL 3,202,736

PROCESS FOR REINFORCING OPEN HEMISPHERICAL TRANSDUCERS

Original Filed Nov. 30, 1962 2 Sheets-Sheet 2

INVENTORS
JOHN J. HORAN
JAMES R. BROWN JR.
MAURICE F. PRESSLER

BY

ATTORNEYS

United States Patent Office 3,202,736

Patented Aug. 24, 1965

1

3,202,736

PROCESS FOR REINFORCING OPEN HEMISPHERICAL TRANSDUCERS

John J. Horan, Willow Grove, James R. Brown, Jr., Abington, and Maurice F. Pressler, North Hills, Pa., assignors to the United States of America as represented by the Secretary of the Navy Original application Nov. 30, 1962, Ser. No. 241,452, now Patent No. 3,158,762. Divided and this application May 19, 1964, Ser. No. 368,724

4 Claims. (Cl. 264—61)

(Granted under Title 35, U.S. Code (1952), sec. 266)

This is a divisional application of patent application Serial No. 241,452, for Open Hemispherical Transducers by John J. Horan et al., filed November 30, 1962.

The invention described herein may be manufactured and used by or for the Government of the United States of America for governmental purposes without the payment of any royalties thereon or therefor.

This invention relates to piezoelectric acoustic transducers for use in underwater sonar and more particularly relates to devices employing polarized ferroelectric materials, such as barium titanate, for the generation of energy.

During the early forties the remarkable electrical properties of barium titanate and other alkali earth metal titanates were noted and the material rapidly gained importance for the preparation of small ceramic capacitors largely because of the high dielectric constant of the titanates as compared to titanium dioxide. Shortly thereafter it was found that the titanates when properly manufactured possessed unusual ferroelectric properties. It was found, for example, that if one polarized the titanate polycrystalline mass through appropriate application of voltage to electrodes placed thereon, a device was produced which would release energy to an outside load circuit under application of mechanical force. This effect has now been applied to the fabrication of numerous commercial and military devices.

Sonar transducers, employing polarized ferroelectric materials, may be employed as passive listening devices or hydrophones which yield an electrical impulse when subjected to the distortion produced by a traveling change in sound pressure. Also, by impressing a voltage pulse upon the transducer, the transducer itself may be caused to deform and thereby initiate a sound pressure wave in a water medium. When the transducer is so employed it is known as a projector or pinger.

Polycrystalline piezoelectrics, as represented by various fired barium titanate, lead titanate zirconate, etc., formulations are ceramics which may be produced in various shapes by a variety of processes including pressing and slip casting followed by firing at high temperatures in a kiln. Unlike earlier pure single crystal piezoelectrics they must thereafter be polarized by the imposition of a voltage on the order of 20 to 100 volts per mil of thickness between their electroded surfaces; the electrodes normally being baked-on silver coatings.

The conversion process by which sound pressures are translated into voltages and vice versa involves the straining or distortion of the ceramic. The ceramic is subjected to a stress loading which is the sum of the transient stress and the steady-state stress. The transient stress is that stress which is induced by the application of the voltage upon the ceramic. The steady-state stress is that stress which is induced by the hydrostatic pressure which acts on the transducer when the same is submerged in a water medium. If the transducer is to function with desired efficiency it is necessary that a pressure release medium, such as air which will reflect sound waves, must lie adjacent the ceramic. Unfortunately in the case of a hydrophone, the presence of the pressure release medium makes it necessary to design the ceramic body heavy enough to withstand a stress imposed by the combined hydrostatic and hydro-acoustic pressures. When the transducer is used as a projector it must be heavy enough to stand the stresses imposed by hydrostatic forces plus those stresses induced in itself by the electrical signals thereupon impressed which actually produce sound only by changing the shape of the transducer material itself.

2

Care must be taken that the transducer be not over designed for when stress values imposed are low, the electrical output of a hydrophone will also be low. Moreover, space within sonobuoys which utilize transducers is too valuable to permit it to be wasted on bulky designs if more compact ones can be made available. One of the several important considerations in working toward operational and structural efficiency is that the combined stress value should approach the maximum that a quality ceramic can stand without cracking, depolarization, or other type of failure. The structure should also be such that similar values of mechanical stress should be reached as nearly as possible throughout the body so that all of the ceramic is contributing its share.

The sphere has long been known as an efficient pressure vessel and designers have recognized that the sphere has applicability as a transducer. However, means for safeguarding weak areas of spheroidal transducers or eliminating such weak areas have not been developed. The brittleness of the material and the difficulty of holding tolerances throughout the processing create vast problems which have heretofore remained unsolved.

Accordingly, it is an object of the present invention to utilize the spherical configuration and the inherent advantages contained therein and also to avoid the many disadvantages of this particular spherical structure.

An additional object of the invention is to produce a hemispherical transducer wherein the edges of the same are structurally strengthened in order to obtain increased sensitivity when the transducer is used as a hydrophone.

Various other objects and advantages will appear from the following description of several embodiments of the invention and the novel features will be particularly pointed out hereinafter in connection with the appended claims.

In the drawing:

FIG. 1 illustrates a cross sectional view of one embodiment of the invention;

FIG. 2 is a cross sectional view of the lip or rim portion of a second embodiment of the present invention;

FIG. 3 illustrates a cross sectional view of still another embodiment of the present invention;

FIG. 4 is a detailed view of the lip or rim portion of another embodiment of the invention also in cross section;

Figure 8:
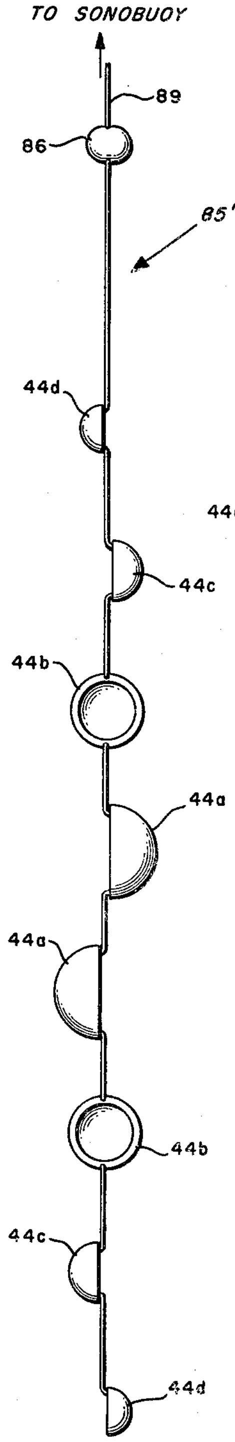
FIG. 8 is a schematic diagram showing the mechanical arrangement of transducers in FIG. 7 after the transducer array has been opened.

Referring now to FIG. 1, there is shown a hemispherical transducer generally noted as 10, preferably formed of a slip cast or pressed polarized ceramic body 11 having an outer electrode 12 and an inner electrode 13 of silver or other appropriate material baked thereon. The ceramic body 11 may be formed from barium titanate, lead titanate zirconate, or any other appropriate polycrystalline piezoelectric. A concentric liner 14 is arranged within the transducer 10 and has an outside diameter smaller than the inside diameter of the ceramic body 11. Thus, transmission of forces between the greater portion of the interior surface of the ceramic body 11 and the outer surface of the liner 14 is blocked and substantial transmission of sound across the gap 15, formed between the liner and ceramic body, is barred by the acoustic impedance mismatch between the ceramic and the air in the narrow gap 15. The interior surface of the ceramic is thus a reflector and the thin layer of air in the gap 15 serves as what is known as a "release material." This thin layer of air is found to be substantially as effective as a large cavity that might be trapped inside a hollow closed sphere and also provides the additional advantage of a more dense transducer which thereby increases the sinking rate of the transducer in water.

Normally, a thin walled ceramic element such as 11 will have been polarized across its thickness, that is, between the outer electrode 12 and the inner electrode 13 prior to assembly.

Electrical connections may be taken from outer electrode 12 and inner electrode 13 in a variety of ways, depending in part upon whether one side of the circuit may be grounded. In FIG. 1, a single conductor 16 is shown soldered at 17 to the inner electrode 13 on the ceramic body 11 and emerging through a gap in sealant 18. The sealant 18 is composed of an insulating material which extends circumferentially about the lip 19 of the ceramic body 11 and about end portion 21 of the metallic liner 14, and serves to provide closure between the metallic liner 14 to the lip portion 19 of the ceramic body 11. A second conductor 22 is soldered at 23 to the outer electrode 12 and emerges together with the first conductor 16 through a projection 24 in outer insulating coating 25. The outer insulating coating 25 is formed of a neoprene or epoxy composition and acts as an insulating and waterproofing material.

In order to allow an internal connection to be made to the outer electrode, it is within the contemplation of this invention that the outer electrode 12 be extended locally in a strip about the lip 19 of the body 11; the inner electrode 13 being separated therefrom. By reason of this construction, a connection similar to that used by the first conductor 16 may also be used for the outer electrode. Alternatively, it is contemplated that either of the electrodes may be bonded and grounded to the concentric liner 14 by the use of a conductive material, such as silver, interposed within the sealant 18 or by a direct connection between the electrode and liner 14.

Finally, it is contemplated that the liner 14 may be formed of a plastic material in those cases where the hydrophone is used at shallow depths; it being noted that greater depths will cause stretching of the plastic and closure of the gap 15.

Referring now to FIG. 2, there is shown a second embodiment of the lip portion of the ceramic body 11 which resists the increased stress caused by submersion in deep water. In this embodiment, a liner 31 has a portion 32 of increased diameter adjacent the flange 33. The increased diameter portion 32 is only sufficiently smaller than the inside diameter of lip 34 of the ceramic body 35 to provide fitting clearances and tolerances. Instead of a flexible sealant such as is shown in FIG. 1, a thin sealant 35 of generally firm high modulus material is used to fill the clearance and to provide a transfer of support from the liner 31 to the lip 34. The liner 31 is additionally formed with an aperture 37 drilled through the flange 33 to provide access for an insulated lead 38 which in turn is soldered at 39 to the inner electrode 40. The sealant arrangement and drilled hole arrangement is so formed that no water can leak in under pressure around the lead 39 or past the sealant 35. In addition, the apparatus is encapsulated by a waterproofing and insulating composition 30. By reason of a structural arrangement shown in FIG. 2, the lip portion 34 is almost entirely supported by the metallic liner 31 thereby precluding any cracking of the ceramic body 36 under hydrostatic pressure-induced strains; the metallic liner taking the stress loads in place of the ceramic.

Referring now to FIG. 3, wherein another embodiment of the invention is illustrated, there is shown a transducer denoted generally at 44 and comprising a polarized ceramic outer body 45, a ceramic liner body 46 and an air gap 43 formed therebetween. The two ceramic bodies are concentric and the tolerances between the same are in the same order as that illustrated in FIG. 2. The ceramic liner body 46 is provided at its edges with reinforcing flanges 47 for supporting the lip 48 of the ceramic outer body 45. A shoulder 49 is formed on the flange portion 47 and serves the function of an assembly stop which sets the clearance between the two hemispheres at the upper end. The inherent weakness characteristics of the unsupported or open hemisphere is overcome by the joinder of the two ceramic bodies by a firm cement sealant 51, which causes the rims or lips to be mechanically and mutually supporting.

The functioning of the elements is similar to that of the corresponding ones described in the earlier figures except that the liner body 46 now being of ceramic material also may be polarized and have outer electrodes 52 and inner electrode 53 similar to those of the outer body 45 which has outer electrodes 54 and inner electrode 55. By reason of this arrangement and when the electrodes are properly connected the sensitive area of the hydrophone is approximately doubled with little or no volume penalty.

FIG. 3 illustrates the electrical connections to accomplish this purpose. The two ceramic bodies 45 and 46 have their electrodes connected in parallel wherein the conductor 50 has insulated lead 56 electrically connected to the outer electrode 54 of the outer ceramic body 45 and insulated lead 57 connected at 58 to the inner electrode 55 of the ceramic body 45. The outer electrode 54 is in turn electrically connected to the inner electrode 53 of the ceramic liner body 46 by insulated lead 60. The inner electrode 55 of the outer body 45 is electrically connected to the outer electrode 52 of the liner body 46 by a conductor 64 which extends therebetween. This arrangement is shown schematically in FIG. 6.

For specially deep submersion applications, where it appears undesirable to permit the tensile forces in the inner hemisphere 46 to rise to the level of the compressive forces in the outer hemisphere 45, the inner hemisphere may be made very heavy so as to reduce the tensile stress. In such event, it may become undesirable to couple it electrically to the outer hemisphere 45 and therefore electrodes 52 and 53 may be eliminated.

The manner of assembling leads may again be similar to that shown before. As shown in FIG. 3, however, insulated lead 57 is soldered at 58 to the inner electrode 55. The lead 57 then passes out via a clearance groove 59 formed in the increased-diameter flanged portion 47 of the liner body 46 and thereafter through a countersunk hole 61 formed in the flange 47 of the liner body 46.

Elastic potting material 62, having an affinity for the lead insulation, is carefully applied around the lead 57 and the entire assembly is encapsulated in an insulating coating 63 which may be of neoprene, vinyl, or other suitable composition for waterproofing and insulating the assembly.

Referring now to FIG. 4 which illustrates a modfication of the edge or lip structure of FIG. 3 and the electrical lead construction in more detail, it is seen that the outer hemisphere 66 has a thickened rim 67 which strengthens the weakest portion of the hemisphere and offers greater resistance to hydrostatic pressures. Inner hemisphere 68 is also formed with a thickened rim 69 to both strengthen the inner hemisphere and to also provide additional resistive support to the rim portion 67 of the outer hemisphere 66. The inner and outer hemispheres are pressed or slip cast by conventional methods with rims being initially formed of the same thickness as the remainder of the hemisphere body. The hemispheres are than dried to minimize their susceptibility to damage in the next operation. The rims thereof are then dipped in fresh slip which quickly adheres in a thin growing layer; the hemispheres then being removed and dried again before firing. The slip formulation and timing are so adjusted that the thickening of the flanges will be controlled so as to minimize subsequent machining.

FIG. 4 additionally illustrates a modification of the electrical lead construction wherein the outer electrode 71 of the outer hemisphere 66 and the inner electrode 72 of the inner hemisphere 68 are shown as extending in a narrow band around the enlarged or thickened rim portion 67 and 69, respectively. The electrical lead 73 passes through an aperture in the flange 75 of the inner hemisphere 68 and is electrically connected by solder or conductive cement 76 to each of the end portions of the electrodes 71 and 72. The inner electrode 78 of the outer hemisphere 66 and the outer electrode 79 of the inner hemisphere 68 are illustrated as terminating remotely from the immediate rim flange area and are electrically connected by conductor 80. An outer coating 81 with which the entire assembly has been covered may be of neoprene, vinyl, or other suitable composition for waterproofing and insulating the assembly.

In addition to the thickened lip portion of the embodiment of FIG. 4, it is contemplated that the lips of each of the ceramic bodies may be of dimension equal to the thickness of the remainder of the ceramic body. In this case, the rims of the outer and inner hemispheres may be doglegged or joggled toward each other except for a provision of a small clearance for allowing a lead connection. This dogleg formation will provide additional support and stress resistance to the hydrostatic forces acting on the lip or rim area.

Figure 5:
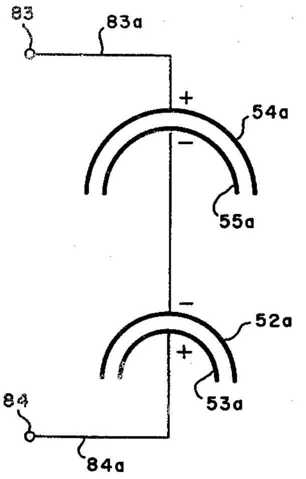
FIG. 5 is a schematic diagram showing one form of polarization and wiring of a transducer such as that illustrated in FIG. 3.
Figure 6:
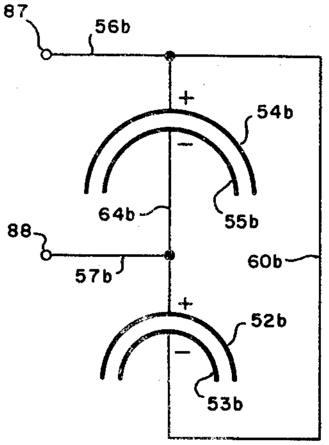
FIG. 6 is a schematic diagram showing a second form of polarization and wiring of a transducer such as that illustrated in FIG. 3.

Referring specifically to schematic FIGS. 5 and 6, there is shown alternate electrical schematics for polarizing and making lead connections to the transducer assemblies of FIGS. 3 and 4.

These electroded ceramic piezoelectric elements are actually forms of condensers that have unusually high capacitance for their limited electrode areas because of the extraordinarily high dielectric constants of these ceramics. Thus, in FIGS. 5 and 6 each electroded hemisphere is represented schematically as a curved plate condenser. Each of the two figures shows a differently prepolarized arrangement of elements as indicated by the plus and minus signs. In FIG. 5 the outer electrode *54a* has been prepolarized as indicated by the plus sign whereas the inner electrode *55a* has been represented with a minus sign. The outer electrode *54a* is electrically connected to the terminal 83 by means of conductor *83a*. The inner electrode *55a* is electrically connected to the outer electrode *52a* which has been negatively prepolarized. The inner electrode *53a* is designated as having positive prepolarization and is electrically connected to terminal 84 through conductor *84a*.

Referring now to FIG. 6, which is the schematic of the arrangement shown in FIG. 3, outer electrode *54b* is indicated as having positive prepolarization and is electrically connected to terminal 87 by means of conductor *56b*. The inner electrode *55b* has a minus or negative prepolarization and is electrically connected to both terminal 88 by conductor *57b* and to the outer electrode *52b* by conductor *64b*. Electrode *52b* has been prepolarized in the positive sense whereas inner electrode *53b* is shown with negative prepolarity . The inner electrode *53b* is additionally shown to be connected electrically by conductor *60b* to the outer electrode *54b*. Both of the arrays shown in FIGS. 5 and 6 might appear incorrectly wired if judged by the arrangements used, for example, in hooking up batteries to supply power. Both arrays are actually correct, however, for the transducer array. Remembering that the outer hemispherical elements generally are under compression (or compressive stress) when submerged in deep water, it will be seen that the inner element must develop tensile strees tending to increase its inside diameter when subjected to some high hydrostatic pressure. Thus, if both have been polarized in the same direction, plus to minus from outside to inside as in FIG. 6, they will develop charges in opposite directions because the polarity or sign of stress application in the stretched inner hemisphere will be opposite that in the compressed outer hemisphere. Just as this is true of the static forces induced by immersion so it is also true under dynamic forces applied to the hydrophone by arriving sound pressure waves. The connection arrays shown in FIGS. 5 and 6 will permit a dynamic output to be additive and not mutually cancelling.

Figure 7:
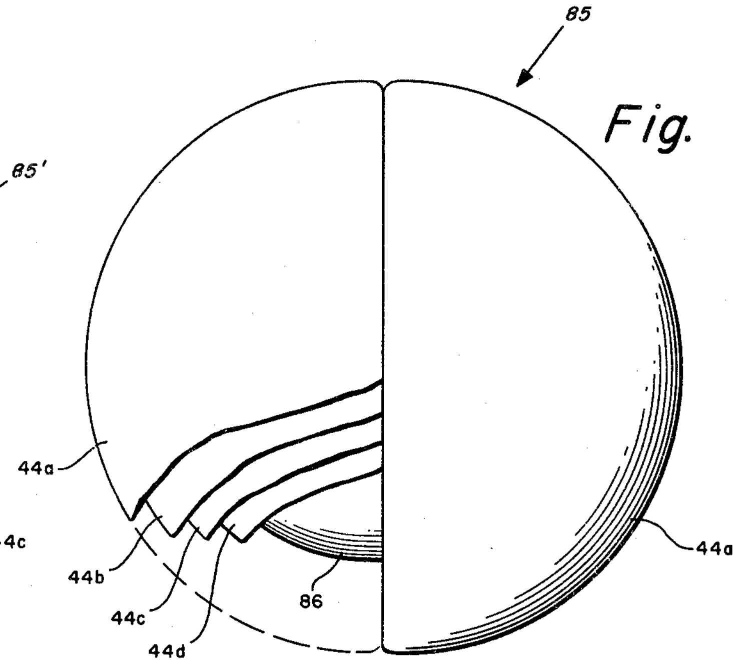
FIG. 7 is a cutaway view showing a multiple array of transducers in a stacked configuration.

Referring now to FIG. 7, there is shown a packaged transducer array generally noted at 85 consisting, first, of eight transducer assembies in four sizes and a central, generally spherical housing 86. The eight transducers consist of two each of four different sizes and are hemispherical in shape with the edges of equal-diameter hemispheres in abutting relationship. The view of FIG. 7 illustrates the nested arrangement of the transducers in partially cutaway view illustrating the transducers *44a*, *44b*, *44c* and *44d*. The structural configuration of these aforementioned transducers is similar to that shown in the embodiment of FIG. 3. However, it is contemplated that any of the embodiments shown in FIGS. 1 to 4 may be utilized in the nested array. The housing 86, which is inserted within the cavity formed by the two identical hemispherical elements *44d*, may be utilized to contain an amplifier or any other appropriate electronic or mechanical equipment.

Usually, in submarine-search operations, it is preferred that the hydrophone have high horizontal sensitivity and that it reject or cancel signals received from both the surface and the bottom of the water medium. When a pinger or projector arrangement is utilized it is desirable to transmit more sound energy in a horizontal direction. Such characteristics are obtained by the elongated transducer array generally noted as 85′ in FIG. 8. This line type of transducer array consists of a number of relatively similar units strung one below the other in a vertical line; the spacing between units varying directly with wavelengths (or inversely with frequency). It should be noted here that the hemispherical transducer array of FIG. 8 evolves from the packaged array 85 of FIG. 7.

Referring again to FIG. 8, it will be seen that the larger hemispheres *44a* are located at the center of the strung-out array and that the generally spherical central housing 86 may, in the case of a hydrophone array, house a transistor preamplifier so located as to raise the level of the signal being sent up the cable as compared with the level of the interference noise that will ordinarily be picked up by the cable. This amplified signal is directed to the sonobuoy by conductors 89. Thus it will be seen that the hollow hemisphere and the hollow hemisphere array obtained new levels of inherent adaptability to incorporation in an ideally balanced ultracompact line transducer array having high sensitivity for its relatively small size.

It is within the contemplation of this invention that the line projector array can achieve maximum performance by "shading" wherein the middle elements in the array are fed more power. Also maximum performance in a line hydrophone array can be gained if the relative sensitivity (or relative voltage or energy output) increases from the elements at the ends of the array toward those at the center. The larger elements, of course, convert more energy than do the smaller ones.

If any degree of preferential or unbalanced shading is desired, hemispherical elements of the center housing 86 of FIG. 7 may also be made of polarized and electroded ceramics in the same manner as the element of the outer hemispheres. Also the housing with its pre-amplifier can be most easily located at the upper end of the array to give a slight downward deflection of the center of the omnidirectional horizontal beam pattern, thus in part countering the usual tendency of horizontal beams to be refracted upward due to thermal and pressure conditions encountered in the ocean.

Finally, the array made possible by the use of these new hollow hemispherical transducers makes it possible to achieve previously unrealizable transducer sinking speeds, so that a sonobuoy utilizing the hemispherical array will be able to display its array in proper listening position at proper depth and free from the sound of relatively moving water at the earliest possible instant after the sonobuoy has been dropped from the aircraft. These sinking speeds are realized through the unprecedented density and superior external configuration of the array as pictured in FIG. 7. The volumes of the air contained within the hemispheres are less than for any other transducers known to the art, since they need actually be only a few thousandths of an inch thick because of the inherent stiffness of the spherical construction itself. The clearance spaces between the successive transducer elements *44a*, *44b*, *44c*, *44d* and housing 86 may be filled with a dense, non-packing, granular material, such as a metal oxide powder; and the over-all array itself, in stowage configuration as shown, being a quite dense sphere, is inherently a more efficient sinking body than other transducers.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A method of increasing the edge strength of an open hemispherical ceramic element comprising the steps of
- slip-casting a ceramic element in the form of a hollow hemisphere,
- drying said hemisphere,
- dipping the rim of said hemisphere in a fresh slip solution until a thin layer adheres to said rim,
- drying said hemisphere for a predetermined time interval,
- and firing said hemisphere after the termination of the drying operation.

2. The method of claim 1 wherein said hollow hemisphere is of constant thickness throughout.

3. In a method for increasing the edge strength of a transducer constructed of a sensitive element of electrostrictive material, said element being in the form of a hollow hemisphere having a rim thereabout, a pair of electrodes, one disposed on the inner face and one on the outer face of said hemisphere, and a concentric liner means having a diameter less than the diameter of said hollow hemisphere secured to said hemisphere for supporting said rim and forming an air gap, the steps comprising:
- slip-casting a ceramic element in the form of a hollow hemisphere,
- drying said hemisphere,
- dipping the rim of said hemisphere in a fresh slip solution until a thin layer adheres to said rim,
- drying said hemisphere for a predetermined time interval,
- and firing said hemisphere after the termination of the drying operation.

4. In a method for increasing the edge strength of a transducer constructed of a sensitive element of electrostrictive material, said element being in the form of a hollow hemisphere having a rim thereabout, a pair of electrodes, one disposed on the inner face and one on the outer face of said hemisphere, and a concentric ceramic liner having a diameter less than the diameter of said hollow hemisphere secured to said hemisphere for supporting said rim and forming an air gap, the steps comprising:
- slip-casting a ceramic element in the form of a hollow hemisphere,
- drying said hemispheres,
- dipping the rims of said hemispheres in a fresh slip solution until a thin layer adheres to said rim,
- drying said hemispheres for a predetermined time interval,
- and firing said hemispheres after the termination of the drying operation.

References Cited by the Examiner

UNITED STATES PATENTS

| | | | |
|---|---|---|---|
| 1,978,323 | 10/34 | Power | 264—133 XR |
| 3,016,597 | 1/62 | Denes | 264—61 |
| 3,052,949 | 9/62 | Williams et. al. | |

FOREIGN PATENTS

| | | |
|---|---|---|
| 856,762 | 12/60 | Great Britain. |

ROBERT F. WHITE, *Primary Examiner.*